(12) United States Patent
Locke

(10) Patent No.: US 7,787,558 B2
(45) Date of Patent: Aug. 31, 2010

(54) RAPID RE-SYNCHRONIZATION OF COMMUNICATION CHANNELS

(75) Inventor: Michael Locke, Santa Clara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 596 days.

(21) Appl. No.: 11/880,940

(22) Filed: Jul. 24, 2007

(65) Prior Publication Data

US 2009/0028267 A1 Jan. 29, 2009

(51) Int. Cl.
*H04L 25/49* (2006.01)
(52) U.S. Cl. .............. 375/293; 375/295; 375/222; 375/259; 370/208; 370/210; 370/335
(58) Field of Classification Search .......... 375/293, 375/295, 222, 296, 260; 370/280, 208, 210, 370/335
See application file for complete search history.

(56) References Cited

U.S. PATENT DOCUMENTS 5,914,988 A * 6/1999 Hu et al. .............. 375/341
2002/0163880 A1 * 11/2002 Matsumoto ............ 370/208
2009/0028268 A1 * 1/2009 Locke ..................... 375/295

FOREIGN PATENT DOCUMENTS

WO WO-2006039803 A1 4/2006

* cited by examiner

*Primary Examiner*—Eva Y Puente
(74) *Attorney, Agent, or Firm*—Steven A. Shaw; W. James Brady; Frederick J. Telecky, Jr.

(57) ABSTRACT

A method of synchronizing a receiver with a transmitter. The method includes determining number of bits, j, for adjusting a bit stream, where the bit stream is generated from n tones and is dividable into codewords having a codeword length of N bytes, and the number of bits for adjusting the bit stream is determined based upon n and N. The method includes detecting a loss of synchronization indication. In response to detection of the loss of synchronization indication, the method includes adjusting the bit stream by j bits. The method includes determining whether synchronization has been regained. When synchronization has not been regained, the method includes adjusting the bit stream again by j bits. When synchronization has been regained, the method includes terminating adjustment of the bit stream.

25 Claims, 8 Drawing Sheets

RAPID RE-SYNCHRONIZATION OF COMMUNICATION CHANNELS

BACKGROUND INFORMATION

There are many reasons for a wired communications device or a wireless communications device to change the power level being used to communicate with another device. Possible motivations for changing the power level may involve a desire to decrease the potential for interference with other devices or comply with regulatory standards specifying a certain power spectral density mask.

Interference among devices is a significant problem in both wireless communications and wired communications networks. In wired networks, the interference is partly due to the close proximity of cables next to each other carrying signals at high frequencies and often in a common band.

The problem of interference is particularly bad in wired networks that were designed to carry relatively low-frequency, low-power analog signals, such as voice telephone signals, but are now being used to carry relatively high frequency and higher power modem signals. FIG. 1a illustrates a bundle of cables carrying various types of signals as commonly found in a bundle including cables for telephone signals.

As illustrated in FIG. 1a, the increasing use of digital subscriber line (DSL) technology to provide relatively high-speed access to the Internet has made the problem of interference in cables carrying telephone and data signals more common and more likely. Examples of DSL technology include HDSL and ADSL. HDSL refers to high-data rate DSL, and ADSL refers to asymmetric DSL. In ADSL, the upstream data rate from the subscriber to the central office is lower than the downstream data rate from the central office to the subscriber. A particularly bad form of interference in the wired communications context and particularly for DSL communications is referred to as crosstalk.

FIG. 1b illustrates examples of crosstalk in DSL links. There are several types of crosstalk including two typically dominant ones: near-end crosstalk (NE-XT, or NEXT); and far-end crosstalk (FE-XT, or FEXT). In links 100, NE-XT interference is due to signals that are transmitted in opposite directions and is illustrated by interference 103 that is caused by transmitter 102a to receiver 104b. In NE-XT interference the output of a nearby transmitter goes into a nearby receiver, and the transmitter and receiver need not be using the same technology (e.g, ADSL) to communicate. In the case of FE-XT, interference is due to signals that are transmitted in the same direction, and again, the transmitters and receiver need not be using the same technology (e.g, ADSL) to communicate. FE-XT interference is illustrated by interference 105 that is caused by transmitter 106a to receiver 104b.

'Self NE-XT' refers to NE-XT interference that is due to transmitters using the same technology as the receiver. For example, ADSL modems cause interference to other ADSL modems. 'Self FE-XT' refers to FE-XT interference that is due to transmitters using the same technology as the receiver. Again, an example would be ADSL modems causing interference with other ADSL modems.

The nature of self-NEXT and self-FEXT is such that increasing the average transmitted power generally does not appreciably change the distance over which a modem can communicate because crosstalk power changes in direct proportion to the average transmitted power. On short loops, VDSL (very high speed digital subscriber line) modems provide high bandwidth, but have limited reach due to self-NEXT and self-FEXT. VDSL modems typically transmit data in the 13 Mbps to 55 Mbps range over distances of about 4500 feet of twisted pair copper wire, but longer ranges are also becoming possible and higher data rates may be possible as well.

Nevertheless, dynamically varying the transmit power for VDSL modems has been discussed at the International Telecommunications Union (ITU). A proposal that was made involved switching between a full power mode and no power mode and using a secondary control channel to alter modem state. The proposal suffers from at least two principal defects: 1) sudden changes from no power to full power by one or more modems are likely to result in other modems losing synchronization (i.e., not 'environmentally friendly' to other devices trying to communicate) and having to 're-train' to regain synchronization; and 2) the switching mechanism using the secondary control channel is relatively too slow. Furthermore, regaining synchronization is a relatively slow process.

Consequently, the problems of changing power quickly and minimizing the adverse effect on other devices are substantial issues that need addressing with solutions that overcome the deficiencies of the prior art.

SUMMARY

In an embodiment, a method of synchronizing a receiver with a transmitter is described. The method includes determining number of bits, j, for adjusting a bit stream, where the bit stream is generated from n tones and is dividable into codewords having a codeword length of N bytes, and the number of bits for adjusting the bit stream is determined based upon n and N. The method includes detecting a loss of synchronization indication. In response to detection of the loss of synchronization indication, the method includes adjusting the bit stream by j bits. The method includes determining whether synchronization has been regained. When synchronization has not been regained, the method includes adjusting the bit stream again by j bits. When synchronization has been regained, the method includes terminating adjustment of the bit stream.

BRIEF DESCRIPTION OF THE DRAWINGS

The invention is illustrated by way of example, and not limitation, in the figures of the accompanying drawings in which like references denote similar elements, and in which.

DETAILED DESCRIPTION

Figure 1A:
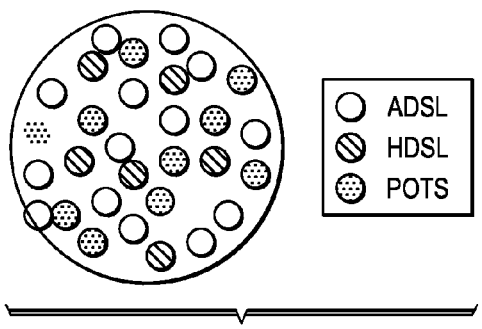
FIG. 1a illustrates a bundle of cables carrying various types of signals as commonly found in a bundle including cables for telephone signals.
Figure 1B:
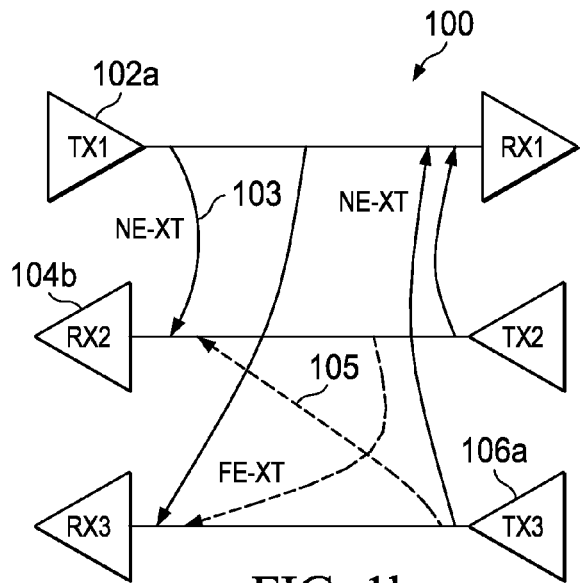
FIG. 1b illustrates examples of crosstalk in DSL lines.

According to the invention, methods and apparatus for rapid resynchronization of communication channels are described. In the following description, for purposes of explanation, numerous specific details are set forth in order to provide a thorough understanding of embodiments according to the invention. It will be evident, however, to one of ordinary skill in the art that the invention may be practiced in a variety of contexts including orthogonal frequency division modulation systems without these specific details. In other instances, well-known operations, steps, functions and elements are not shown in order to avoid obscuring the description.

Parts of the description will be presented using terminology commonly employed by those skilled in the art to convey the substance of their work to others skilled in the art, such as discrete multi-tone (DMT), constellation, digital subscriber line (DSL), inverse fast Fourier transform (IFFT), trellis coder or decoder, Reed-Solomon coder or decoder, convolutional interleaver, and bit-loading among other terms. Various operations will be described as multiple discrete steps performed in turn in a manner that is most helpful in understanding the various embodiments of the invention. However, the order of description should not be construed as to imply that these operations are necessarily performed in the order that they are presented, or even order dependent. Repeated usage of the phrases "in an embodiment," "an alternative embodiment," or an "alternate embodiment" does not necessarily refer to the same embodiment, although it may. Additionally, one of ordinary skill in the art would appreciate that a graphical description of an apparatus in the figures of the drawings interchangeably represents either an apparatus or a method.

A common form of modulation for use with digital subscriber line service is discrete multi-tone (DMT) modulation. In DMT modulation, a communication channel is divided into narrowband sub-channels also often referred to as sub-carriers, bins, or tones. Each of the sub-channels is modulated by a sub-carrier that is orthogonal to the other sub-carriers allowing for relatively high spectral efficiency. During initialization of a communications link between two modems, the signal-to-noise (SNR) ratio for each of the sub-channels is estimated. The SNR estimate associated with each sub-channel is then used to set the number of bits each sub-channel will pass during the time period of a single data frame. The number of bits assigned to each sub-channel is stored in a bit table.

When transmission is occurring on a sub-channel, the bits assigned to a sub-channel affect the modulation format used on the sub-channel. For example, when 4 bits are assigned to a sub-channel, 16 QAM (quadrature amplitude modulation) may be used to represent the 4 bits during a symbol (also referred to as frame in some cases) time period. The 4 bits can be represented graphically by a signal point or signal constellation point. When 5 bits are assigned to a sub-channel, 32 QAM may be used.

Figure 2A:
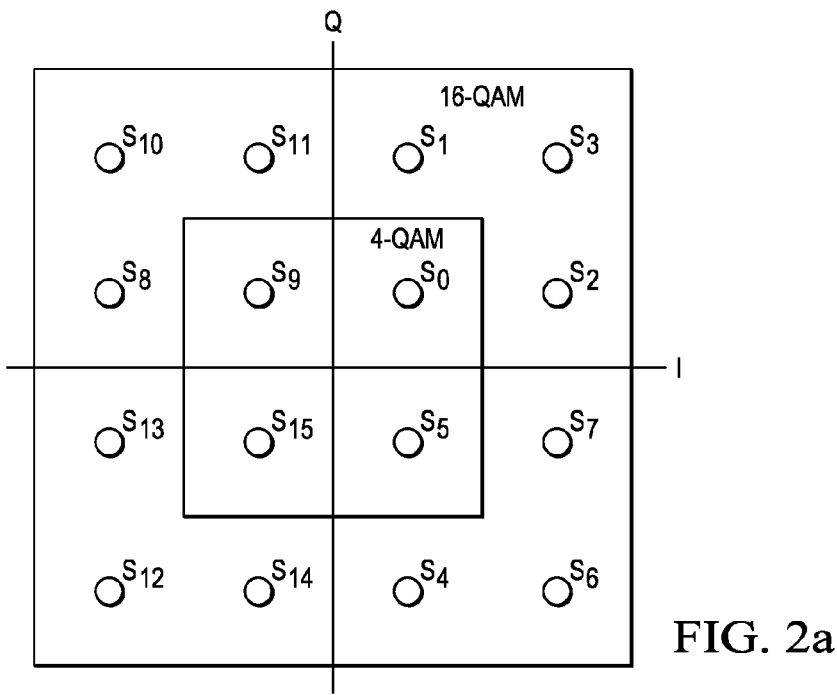
FIG. 2 illustrates an I, Q plane for 16-QAM and 4-QAM signal constellation modulation schemes.

FIG. 2a illustrates an I, Q plane for 16-QAM and 4-QAM signal constellation modulation schemes. In FIG. 2a, for 16-QAM, symbol $S_0$ represents bits '0000.' Symbols $S_1$ and $S_2$ represents bits '0001' and '0010,' respectively, and so forth up to $S_{15}$ which represents '1111.' The inner 4 symbols $S_0$, $S_5$, $S_9$, $S_{15}$ of 16-QAM represent symbols $S_0$, $S_1$, $S_2$, $S_3$, respectively, of 4-QAM.

When the data rate required across a communications link decreases because, for example, a high-data rate application such as (but not limited to) video is turned off, the transmit data rate and the bit loading on sub-carriers may be decreased. Decreasing the data rate may result in a corresponding decreased in the transmit power level which can result in a decrease in the crosstalk noise interference to other modems. When a high data rate is again required, the bit rate and bit-loading can be increased.

Figure 3A:
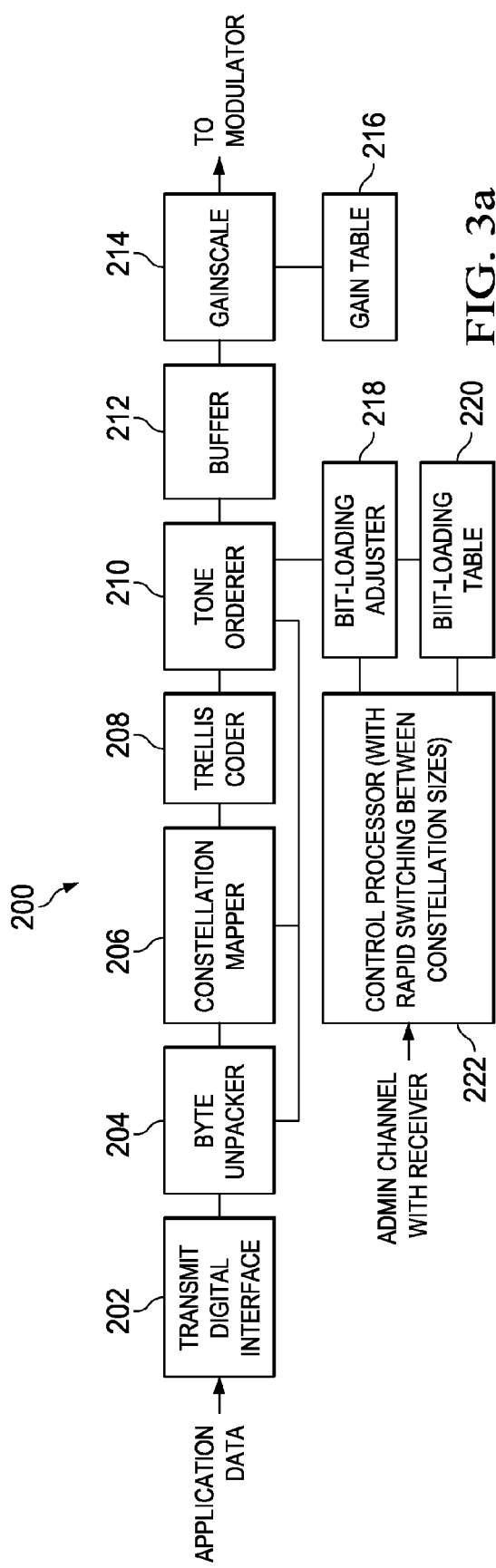
FIG. 3a illustrates a block diagram of a transmitter chain according to an embodiment.

FIG. 3a illustrates a block diagram of a transmitter chain according to an embodiment. Transmitter chain 200 includes transmitter digital interface (TDI) 202 which accepts application data from multiple sources and supplements it and formats it in a manner suitable for further processing by byte unpacker (BU) 204. BU 204 disassembles bytes received from TDI 202 and produces bits that are assigned to particular tones according to tone bit-loading information provided by tone orderer (TO) 210. TO 210 receives tone bit-loading information from bit-loading table 220 that may be, as described in greater detail below, adjusted by bit-loading adjuster 218 as dictated by control processor 222. In an embodiment, CP 222 sends a 0 bit cutback indication, 1 bit cutback indication, or 2 bit cutback indication to adjuster 218. Adjuster 218 provides tone bit-loading entries from table 220 to TO 210 either unadjusted or adjusted according to the cutback indication provided by CP 222. In an embodiment, every two adjacent tones are loaded together with bits, but TO 210 may in an alternative embodiment reorder tones loaded with 0 bits and 1 bits. In such an embodiment, TO 210 provides the adjusted and possibly reordered bit-loading table entries of table 220 to BU 204 and mapper 206.

In an embodiment, control processor 222 uses network statistics to decide to change the bit loading and the data rate. This may include examining the status of packet queues (not shown) or measuring the recent average flow rate of data. The specific mechanism for deciding what data rate to use is immaterial to the invention, but rather that some mechanism can take advantage of the power cutback scheme described herein that results in changing the bit-loading on the tones.

Table 1 below illustrates information stored in a bit loading table according to an embodiment. The actual number of bits assigned to a particular sub-channel are simply illustrative and not limitations of any particular embodiment. Furthermore, the invention is not limited to any particular value of N, the number of sub-channels (or tones).

TABLE 1

| Sub-channel | Bits |
|---|---|
| 1 | 4 |
| 2 | 4 |
| 3 | 5 |
| 4 | 5 |
| 5 | 7 |
| 6 | 8 |
| 7 | 6 |
| 8 | 6 |
| . | . |
| . | . |
| . | . |
| N | 4 |

The output of byte unpacker 204 is provided to constellation mapper (CM) 206 which provides each group of bits assigned to a tone a particular amplitude and phase associated with the corresponding constellation signal point. Trellis coder 208, which is optional, further codes the bits produced by CM 206. If two adjacent tones that are loaded with bits in tandem by BU 204 can carry a maximum of m and n bits, (m+n−1) bits will be data bits provided by 204 and the $(m+n)^{th}$ bit is coding bit from coder 206. Trellis coders are well known in the art and need not be described further herein.

In an embodiment, the output of tone orderer (TO) 210 is a DMT symbol worth of data that is provided to buffer 212 which is also accessed by gain scaler (GS) 214. GS 214 provides further amplitude adjustment on a per tone basis as specified by gain table 216 so that a specified cumulative transmit power level is achieved for all the tones. The output of scaler 214 is provided to a modulator (not shown) which can include an inverse fast Fourier transform (IFFT) unit for final transmission of the bits to a modem (not shown).

In an embodiment, CP 222 partly controls the operation of TO 210 by instructing bit-loading adjuster 218 to provide tone bit-loading information from bit-loading table 220 a) unadjusted (i.e., full power mode, FPM), b) with 1 less bit per tone (i.e., 1-bit lower power mode, 1BLPM) or alternatively 2 fewer bits per tone (2-bits lower power mode, 2BLPM). If the gain per tone remains constant the use of a smaller size constellation results in a lower transmit power level. CP 222's control signal to bit-loading adjuster 218 may indicate that BU 204 and constellation mapper 206 are to be provided the bit-loading information from table 220 but a) unadjusted (or unmodified), b) reduced by either 1 less bit per tone (1-bit lower power mode, 1BLPM), or c) alternatively 2 fewer bits per tone (2-bits lower power mode, 2BLPM). For the example illustrated by Table 1, BU 204 would put 3 bits on sub-channel 1 if 1BLPM was indicated by CP 222 or 2 bits if 2BLPM was indicated by CP 222.

In an embodiment, TO 210 handles tones loaded with 0 bits and 1 bit differently from the manner for tones which are loaded with 2 or more bits. In an embodiment, TO 210 reorders tones with 0 bits and 1 bit such that they are no longer in the order specified by table 220 and, consequently, provides a re-ordered sequence of the bit-loading table entries before they are passed to constellation mapper 206 and byte unpacker 204. One of ordinary skill in the art would appreciate that in addition to determining the necessary tone ordering based on the adjusted bit loading table entries as illustrated by the block diagram of FIG. 3a an alternative embodiment can have several pre-computed tone ordering tables stored in memory (not shown) that can be accessed by mapper 206 and unpacker 204 based upon the mode.

As indicated above, the exact condition or conditions that would cause CP 222 to indicate to BU 204 and mapper 206 that they are to change to a smaller size constellations (or from a smaller one to a larger one) are immaterial to the invention. An example of a condition that would trigger lower power mode operation (i.e., smaller constellation size operation) could be (but is not limited to) the end of a video stream or the availability of active data for transmission. Furthermore the exact condition or conditions that would cause CP 222 to indicate to adjuster 218 to change the size of the constellation used on each tone is immaterial to the invention. An example of a condition that would trigger higher power mode operation (i.e., larger constellation size operation) could be (but is not limited to) the start of a video stream. An example of yet another condition that would trigger a change in the power mode could be receipt of a signal from the receiver specifying a change in the constellation size relative to the constellation size specified in bit table 220.

Benefits of simply changing constellation size in order to change the data rate or transmit power level, include being able to rapidly adapt to changing resource (bandwidth) demands or to quickly modify power transmit level so as to satisfy the power consumption restrictions imposed by governmental regulatory agencies without having to utilize environmentally hostile large reductions in signal power. Changing constellation size entails BU 204 using the per-tone number of bits specified by table 220, or 1 bit or 2 bits—depending on the lower power mode (or higher power mode) operation specified by CP 222—less (or more) per tone than specified by bit table 220. This change involves a subtract operation performed on-the-fly and need not be implemented with additional memory (not shown) storing alternative bit-loading tables with one less bit per tone or two less bits per tone. However, in an alternative embodiment, additional memory stores multiple alternative bit-loading tables with one less bit per tone or two less bits per tone than specified for the full power bit-loading table.

The invention is not limited to changing the constellation size for all the active tones. Rather, in an embodiment, the control logic of a receiver, such as receiver 240, can communicate with the control logic of a transmitter, such as transmitter 200, over an administrative channel and indicate on which tones reduced (or larger) constellation sizes will be used, the allowed values of change in constellation size relative to the size specified in bit-loading table 220, or both. In an embodiment, the foregoing tone bit-loading information agreed upon by a receiver and transmitter is stored in memory (not shown) and used by CP 222 and adjuster 218 to provide the proper bit-loading information to TO 210. The tones which have not been identified as having reduced (or larger) constellation sizes will be loaded as specified by bit-loading table 220. In an alternative embodiment, the control processor of a transmitter, such as transmitter 200, can communicate with the control logic of a receiver, such as receiver 240 (FIG. 3c), over an administrative channel and indicate on which tones reduced (or larger) constellation sizes will be used, the allowed values of change in constellation size relative to the size specified in bit-loading table 220, or both. In such an alternative embodiment, the foregoing tone bit-loading information agreed upon by a transmitter and receiver is stored in memory (not shown) and used by CP 222 and adjuster 218 to provide the proper bit-loading information to TO 210. The tones which have not been identified as potentially having reduced (or larger) constellation sizes will be loaded by mapper 206 as specified by bit-loading table 220 regardless of the power mode.

In an embodiment, the constellation size is changeable on a per DMT symbol (or DMT frame) basis. A common frame data rate for DSL is 4.059 KHz which means that about every 0.25 milliseconds there is an opportunity to change the constellation size if necessary. A DMT symbol represents the constellation-encoded bits that are loaded on all the tones and transmitted for about 0.25 milliseconds.

Figure 3B:
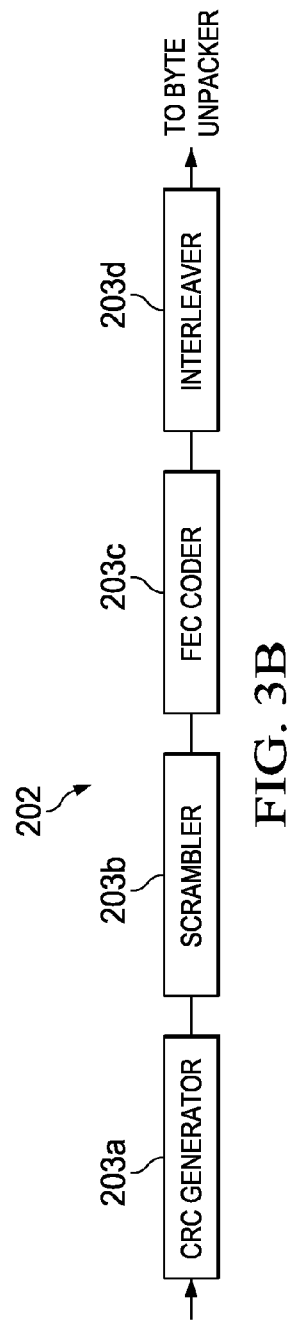
FIG. 3b illustrates the digital interface of FIG. 3a in greater detail in accordance with an embodiment.

FIG. 3b illustrates the digital interface (DI) of FIG. 3a in greater detail in accordance with an embodiment. DI 202 includes CRC generator (CRCG) unit 203a that accepts the output of framer (not shown) that collects data from multiple sources and produces a multiplexed data frame (or muxed data frame). In an embodiment, CRCG unit 203a inserts overhead (OH) byte at relatively short periodic intervals. Every SEQP OH bytes a CRC is inserted, where, in an embodiment, SEQP is 68, but other values are possible.

Figure 4A:
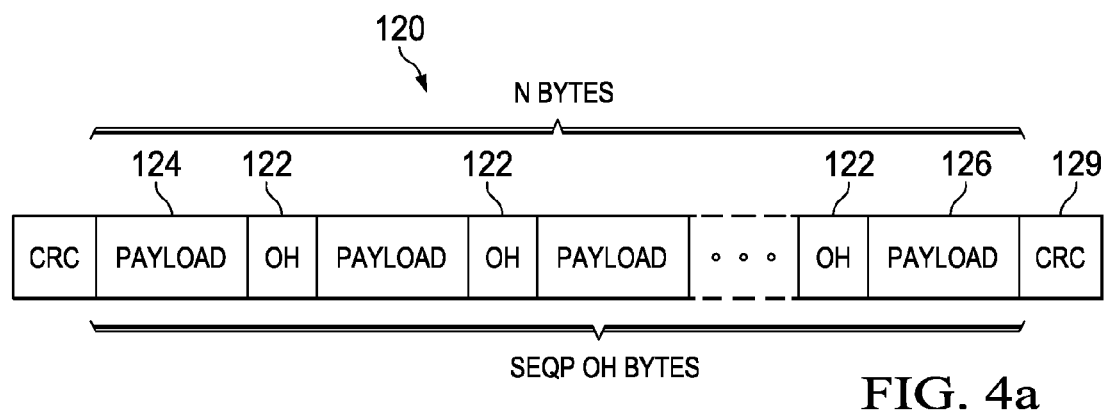
FIG. 4a illustrates the output of a framer according to an embodiment.

FIG. 4a illustrates the output of a CRC generator and overhead byte inserter according to an embodiment. Data stream 120 includes payloads 124, 126 and OH bytes 122. CRC 129 is calculated over all the bytes in payloads 124, 126 and the bytes in between payloads 124, 126. Scrambler 203b scrambles the output of CRCG 203a to minimize the possibility of enormous spikes in amplitude during transmission. Scramblers are well known in the art and their presence or absence in an embodiment is not material to the invention, making additional description unnecessary as one of ordinary skill in the art would readily appreciate.

Forward error correction (FEC) coder 203c is a Reed-Solomon (RS) coder in an embodiment, but other FEC coders are also possible in alternative embodiments. In an alternative embodiment there may be no RS coder or any type of FEC coder. For every K bytes coder 203c receives from scrambler 203b, coder 203c adds R check bytes for error correction such that $K+R=N_{FEC}$. Coder 203c outputs RS codewords with length $N_{FEC}$ bytes. In an embodiment, the first byte of an RS codeward is an OH byte or there are no OH bytes in the codeword. In an embodiment, an RS codeword can be up to 255 bytes ($N_{FEC}$). However, other values of $N_{FEC}$ are possible and depend on the number of bits in the fundamental unit of the codeword which, in an embodiment, is an octet, or 8 bits. If the fundamental unit is 8 bits, one can have at most $2^8-1$ bytes in an RS codeword.

Figure 4B:
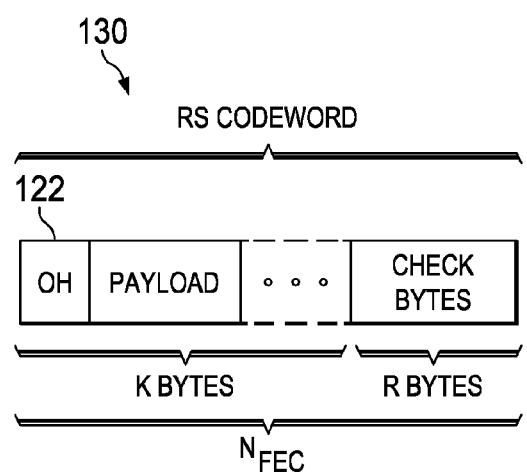
FIG. 4b illustrates an RS codeword according to an embodiment.

FIG. 4b illustrates a RS codeword according to an embodiment. Codeword 130 includes K data bytes and R check bytes for a total of $N_{FEC}$ bytes.

Convolutional interleaver 203d provides immunity against burst noise by interleaving the output of coder 203c across a number of tones and symbols. Interleaver 203d has a block size I and a depth D where, in an embodiment, I is equivalent to $N_{FEC}$, and D is chosen such that I and D are mutually prime (i.e., they have no common factors>1). The interleaved output sequence for an input x(n) with block length I and depth D is given as indicated by Eq. 1:

$$Y((n \bmod I)*D+I*\text{floor}(n/I))=x(n) \quad \text{Eq. 1}$$

Thus, every $I^{th}$ point of x(n) is transmitted without delay, the next sample is transmitted with a delay of D−1, and the next sample is transmitted with a delay of 2*(D−1), etc . . . The output of interleaver 203d is provided to BU 204. The deinterleaver of the receiver chain described elsewhere herein reverses this process.

Figure 3C:
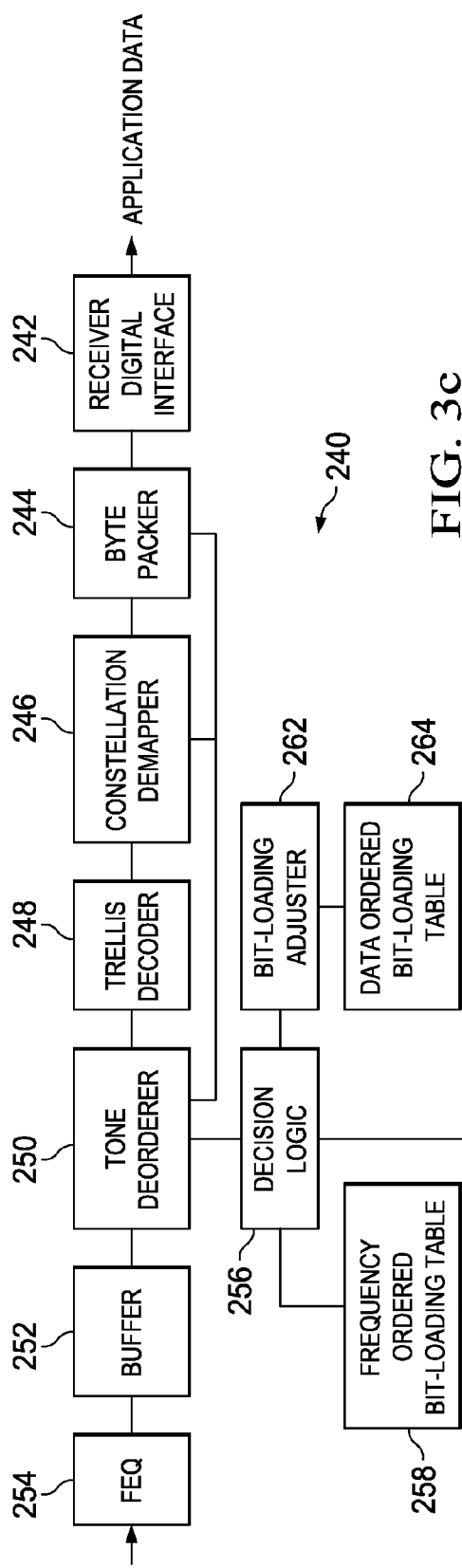
FIG. 3c illustrates a block diagram of a receiver chain according to an embodiment.

FIG. 3c illustrates a block diagram of a receiver chain according to an embodiment. Receiver chain 240 includes a frequency domain equalizer (FEQ) 254 that accepts a frequency domain representation of the analog signal received by the analog front end (not shown) and removes the frequency shaping caused by the communication channel. Equalizer 254 outputs "equalized" frequency spectrum data for each received DMT symbol to buffer 252. In an embodiment, the frequency equalized DMT symbol in buffer 252 has a constant average power output and a specific numeric range of values for each constellation size.

Each DMT symbol in buffer 252 is examined by decision logic (DL) 256 to determine if the received constellations match the average expected size, or if they correspond to a power cutback mode. DL 256 outputs an indication of a cutback by 0 bits (0 bit cutback indication), 1 bit (1 bit cutback indication), or 2 bits (2 bit cutback indication) to bit-loading adjuster 262.

In an embodiment, DL 256 performs the following process in which maxcd(n) is a function that takes the absolute value of the maximum transmitted value for n bits. The process For tones with n=4 bits or more:
if n is even maxcd(n)=$2^{n/2}-1$
if n is odd maxcd(n)=$2^{(n-1)/2}*1.5-1$
For tones with n=0, 1 or 2 bits
   maxcd(n)=1
For tones with n=3 bits
   maxcd(n)=3
For tones with n>5 bits
   ½ of the constellation points have max(abs(Q),abs(I))<=maxcd(n−1)
   ¼ of the constellation points have max(abs(Q),abs(I))<=maxcd(n−2)

These formulae are specific to the encoder described in section 7.8.4 "Constellation encoder" of standard ITU-T G.992.1. One of ordinary skill in the art would appreciate that other encoders or other constellation types would require other formulae and that the invention is not limited to the formulae provided herein or one type of encoder.

For tones in the set to be used in the decision that have more than 5 bits, perform the following processing
n1bit=0
n2bit=0
for (all tones in set with>5 bits)
   if (max(abs(Q),abs(I))<(maxcd(n−1)+T)) n1bit=n1bit+1;
   if (max(abs(Q),abs(I))<(maxcd(n−2)+T)) n2bit=n2bit+1;

If some of the tones to be used in the decision have 5 bits or less, perform the following additional processing. Note that maxcd(4)=maxcd(3)=3 and maxcd(0)=maxcd(1)=maxcd(2)=1 so that additional processing is required to distinguish these points.
for (all tones in set with 5 bits)
   if (max(abs(Q),abs(I))<(maxcd(4)+T)) n1bit=n1bit+1;
   if ((max(abs(Q),abs(I))<(maxcd(3)+T)) AND (min(abs(Q),abs(I))<1+T)) n2bit=n2bit+1;
for (all tones in set with 4 bits)
   if ((max(abs(Q),abs(I))<(maxcd(3)+T)) AND (min(abs(Q),abs(I))<1+T)) n1bit=n1bit+1;
   if (max(abs(Q),abs(I))<(maxcd(2)+T)) n2bit=n2bit+1;
for (all tones in set with 3 bits)
   if (max(abs(Q),abs(I))<(maxcd(2)+T)) n1bit=n1bit+1;
   if ((max(abs(Q),abs(I))<(maxcd(1)+T)) AND (sign(Q)==sign(I)) n2bit=n2bit+1;
for (all tones in set with 2 bits)
   if (sign(Q)==sign(I)) n1bit=n1bit+1;
   if ((sign(Q)==sign(PRBS(Q)) AND (sign(I)==sign(PRBS(I))) n2bit=n2bit+1;

for (all tones in set with 1 bit)//Note: 1 bit tones can be used only if max cutback is limited to 1 bit
   if ((sign(Q)==sign(PRBS(Q)) AND (sign(I)==sign(PRBS(I))) n1bit=n1bit+1;

T is a decision threshold. In an embodiment, the default value of T is 1, but other values may yield slight performance improvements.

sign( ) refers to the numeric sign of the operand.

PRBS( ) refers to the recommendation specified constellation value to assert on a 0 bit tone;
for ADSL2, this is specified in section 8.6.3 of standard G.992.3. If there is no distortion or noise in the signal the decision logic may be
cutback=0 bits
if (n1bit==totaltones) cutback=1 bits
if (n2bit==totaltones) cutback=2 bits, where totaltones is the number of tones examined by the decision logic.

Assuming that the constellations have been properly randomized by a scrambler of a transmitter such as transmitter 200, the probability that a 0 bit cutback is erroneously recognized as 2 bits of cutback is proportional to $4^{-totaltones}$. The probability that a 0 bit cutback is erroneously recognized as 1 bit of cutback is proportional to $2^{-totaltones}-4^{-totaltones}$. The total probability of error is proportional to $2^{-totaltones}$. The probability that a 1 bit cutback is erroneously recognized as 2 bits of cutback is proportional to $2^{-totaltones}$. [Why are the two foregoing error probabilities both $2^{totaltones}$?]

In a noiseless condition, there is neither the probability that a 2 bit cutback will be erroneously recognized, nor that a 1 bit cutback will be erroneously recognized as a 0 bit cutback. However, given that noise is common in practical implementations the problem of erroneous decisions is mitigated by implementing the final decision logic as:
cutback=0 bits
if (n1bit==totaltones*T2) cutback=1 bits
if (n2bit==totaltones*T3) cutback=2 bits T2 and T3 are thresholds that depend on the value of totaltones, the SNR margin, and the nature of any 'unpredictable' but 'characterizable' noise such as impulses. Values ranging from 0.9 to 1.0 are expected to be suitable, but any value between 0 and 1 may be appropriate under some condition. One of ordinary skill in the art would appreciate that T2 and T3 are implementation and operating condition dependent and that they can be determined without undue experimentation. Furthermore, one of ordinary skill in the art would understand how and be able to extend the above teachings to produce decision logic that handles more bits of cutback.

In addition, it would be apparent to one of ordinary skill in the art that DL 256 may examine the entire set of active tones, or any subset of the tones that is sufficiently large. If the cutback determination is used to process the data received on a subset of tones, DL 256, in an embodiment, examines the signal on the tones in that subset.

Depending upon the bit cutback determination made by DL 256, in an embodiment, DL 256 produces a 0 bit cutback indication, 1 bit cutback indication or a 2 bit cutback indication which DL 256 provides to adjuster 262.

When DL 256 produces a 0 cutback indication, based upon the frequency ordered bit-loading table entries of table 258, DL 256 reverses in the DMT symbol stored in buffer 252 the effect of any ordering performed by a tone orderer such as TO 210. Frequency ordered bit-loading table 258 contains entries which indicate the expected bit loading on each of the tones and the order of the tones if they have been reordered by a tone orderer such as TO 210. In an embodiment, CP 260 populates table 258 with appropriate entries after an initialization process with a transmitter, such as transmitter 200, is completed. During the initialization process, the tone bit-loading and active tones are specified allowing CP 260 to determine which tones would have had their order changed by a tone orderer such as TO 210. Tones which would have had their order changed are identified in the entries in table 258 in a manner allowing TO 250 to undo or reverse in the DMT symbol stored in buffer 252 the effect of any ordering performed by TO 210.

When DL 256 produces a 1 bit cutback indication or a 2 bit cutback indication tone deorderer (TDO) 250 determines whether the entries of table 258 need additional modification to account for the cutback producing additional 0 and 1 bit tones that may have required ordering at a transmitter in a manner other than that specified by table 258. If TDO 250 determines that the additional modification is necessary, TDO 250 determines the necessary modifications and based upon the modifications and the entries of table 258 TDO 250 reorders the sequence of the bit loading entries in table 264 before they are passed on to demapper 246 and byte packer 244. One of ordinary skill in the art would appreciate that instead of determining the modifications to the sequence of bit loading entries in table 264 'on-the-fly,' in an alternative embodiment tables which reflect the reordered sequences under the conditions of 1 bit cutback or 2 bit cutback are accessible to demapper 246 and byte packer 244 and are accessed or selected based on the cutback determination made by DL 256. In an embodiment in which lookup tables are used for both tone ordering and computing the bit loading, it is not necessary to feed the bit loading table values through TO 210 or TDO 250 and such units may be unnecessary in alternative embodiments.

In an embodiment, CP 260 generates and stores configuration parameters, including bit-loading tables 258, 264, selection of tones to use in the cutback determination of DL 256, and selection of the tones that are eligible for cutback (for the case in which CP 260 is part of a transceiver which includes a transmitter). In an embodiment, CP 222 performs similar functions using table 220 and a frequency ordered bit-loading table (not shown). Determining the tones suitable for cutback is an implementation detail, but in an embodiment all tones are suitable for cutback. However, alternative embodiments may limit tones suitable for cutback to tones that have a certain SNR or have bit-loading above a certain number of bits (e.g., including but not limited to 4 bits or 6 bits), or a combination of factors including one or more or none of the foregoing factors. Selecting tones to use in the cutback determination of DL 256 is another implementation detail, but in an embodiment a group of the tones with the largest SNR margin are used in making the cutback determination. The number of tones to use is an implementation detail that one of ordinary skill in the art would be able to determine without undue experimentation. Alternative embodiments may use another criterion, besides SNR margin, or criteria. In an embodiment, an analog front-end (not shown) provides an SNR estimate for tones to CP 260 (or CP 222). In an alternative embodiment, a dedicated unit operating at baseband using samples from an ADC (not shown) provides SNR estimates for tones to CP 260 (or CP 222).

Figure 3D:
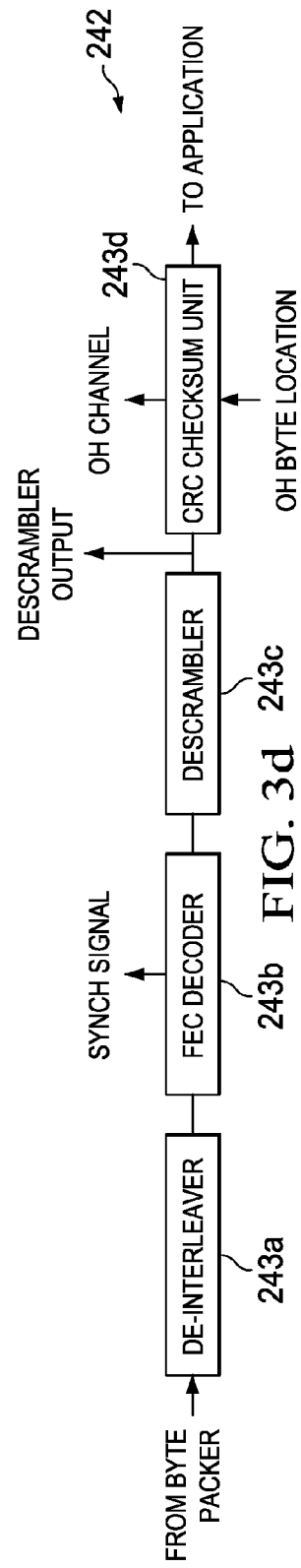
FIG. 3d illustrates in greater detail the digital interface of the receiver chain of FIG. 3c according to an embodiment.

FIG. 3d illustrates in greater detail the digital interface of the receiver chain of FIG. 3c according to an embodiment. Convolutional de-interleaver 243a accepts the output of BPTD 244 and undoes the interleaving performed by interleaver 203e at the transmitter to produce FEC codewords similar to that illustrated in FIG. 4c. The FEC codewords produced by interleaver 243a are decoded by FEC decoder 243b and the K error-corrected data bytes of each codeword are provided to descrambler 243c. Descrambler 243c undoes the scrambling performed by scrambler 203c and provides a data stream similar to that shown in FIG. 4b. CRC checksum (CRCC) unit 243d accepts the output of descrambler 243c, extracts the OH bytes and uses the CRC bytes to perform error detection before outputting cells similar to the one illustrated in FIG. 4a.

As indicated above, when certain conditions—not material to the invention—are satisfied, transmitter chain 200 may use constellation sizes (i.e., bit-loading) that is different from what it agreed to with a receiver such as receiver 240 during a synchronization and link setup process. In an embodiment, the change in constellation size happens without prior agreement with a receiver such as receiver 240. In order to properly decode the received signals, receiver chain 240 detects the change in constellation size and makes adjustments to the operation of receiver chain 240 to reflect whether there has been a change from 0 bit cutback to 1 bit cutback or 2 bit cutback, whether there has been a change from 1 bit cutback to 2 bit cutback or 0 bit cutback, or whether there has been a change from 2 bit cutback to 1 bit cutback or 0 bit cutback. While in an embodiment, after synchronization, data communication starts with the transmitter operating in 0 bit cutback mode, one of ordinary skill in the art would appreciate that communication may, in an alternative embodiment, start in 1 bit cutback and transition to 0 bit cutback mode or 2 bit cutback. Alternatively, communication may start in 2 bit cutback and transition to 0 bit cutback or 1 bit cutback.

One of ordinary skill in the art would appreciate that the invention is not limited to two alternative modes, such as 1 bit cutback and 2 bit cutback, but that the teachings of the disclosure herein can be extended without undue experimentation to additional modes which specify that the bit-loading for tones will be different from the values specified in tables 220, 264 by a degree greater than 1 or 2 bits.

Figure 5A:
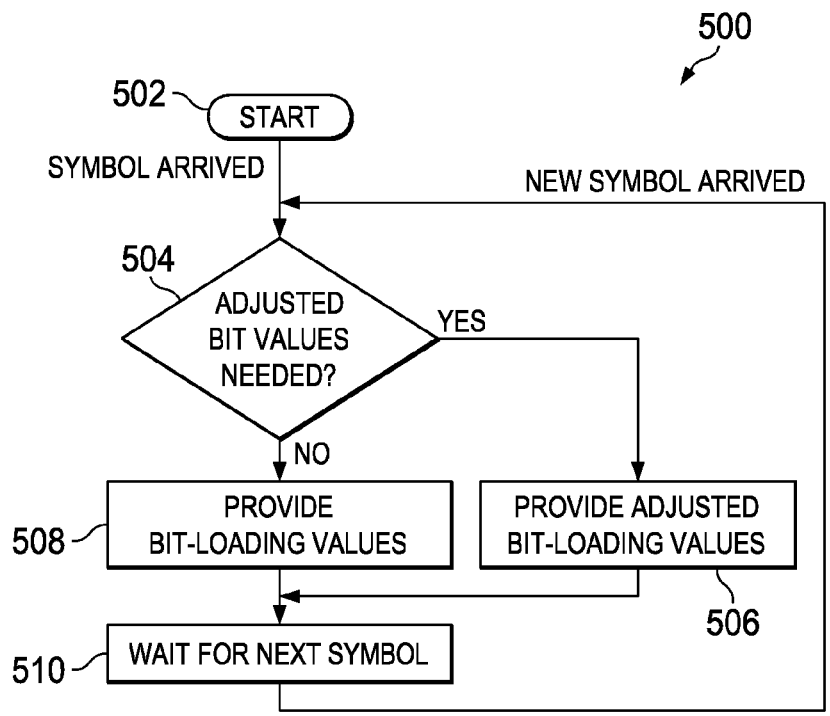
FIG. 5a illustrates a process for changing the mode of operation at the receiver in reaction to a change in received constellation sizes according to an embodiment.

FIG. 5a illustrates a process for changing the mode of operation at the receiver in reaction to a change in received constellation sizes according to an embodiment. In process 500, CP 260 starts 502 by initializing tables 258, 264 in accordance with link parameters that have been agreed to between, in an embodiment, a receiver such as receiver 240 and a transmitter such as transmitter 200. When data communication commences and a data symbol arrives at buffer 252, DL 256 determines 504 whether adjusted bit-loading values need to be provided to demapper 246 and byte packer 244 via table 264 and adjuster 262. In an embodiment in which a tone deorderer such as TDO 250 is present, the adjusted bit-loading values are provided to demapper 246 and byte packer 244 via TDO 250. In an alternative embodiment, the bit-loading values are provided without first passing through a tone deorderer such as TDO 250.

In an embodiment, DL 256 employs the pseudo code described elsewhere herein to make the determination whether adjusted bit-loading values are to be provided. Adjusted bit-loading values are to be provided when DL 256 determines that the symbol in buffer 252 is indicative of a 1 bit cutback or a 2 bit cutback.

When DL 256 determines that the symbol in buffer 252 is indicative of a 0 bit cutback, adjuster 262 provides 508 to TDO 250 bit-loading values from table 264 without modification. Process 500 then waits 510 for another symbol to arrive and transitions, when another symbol, arrives to DL 256 determining 504 again whether adjusted bit-loading values are to be provided.

When DL 256 determines 504 that the symbol in buffer 252 is indicative of a 1 bit cutback, adjuster 262 provides 506 to TDO 250 bit-loading values from table 264 that have been adjusted to indicate that 1 less bit is loaded per tone than specified in the corresponding table entry in table 264. Process 500 then waits 510 for another symbol to arrive and transitions, when another symbol, arrives to DL 256 determining 504 again whether adjusted bit-loading values are to be provided. When DL 256 determines 504 that the symbol in buffer 252 is indicative of a 2 bit cutback, adjuster 262 provides 506 to TDO 250 bit-loading values from table 264 that have been adjusted to indicate that 2 fewer bit are loaded per tone than specified in the corresponding table entry in table 264. Process 500 then waits 510 for another symbol to arrive and transitions, when another symbol, arrives to DL 256 determining 504 again whether adjusted bit-loading values are to be provided.

Figure 5B:
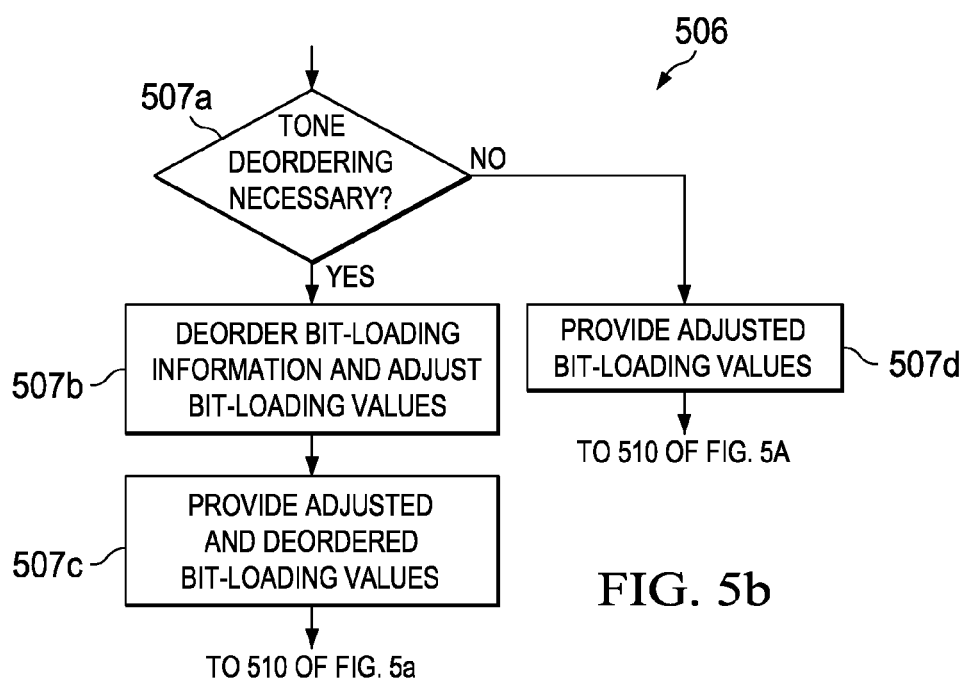
FIG. 5b illustrates the operation of providing adjusted bit-loading values of FIG. 5a according to an alternative embodiment of the invention.

FIG. 5b illustrates the operation of providing adjusted bit-loading values of FIG. 5a according to an alternative embodiment of the invention. As indicated elsewhere herein, a tone orderer and a tone deorderer are optional. In an embodiment in which a tone orderer is present in the transmit chain, a tone deorderer such as TDO 250 undoes at the receiver the ordering performed at transmitter. In an alternative embodiment, at a receiver, providing 506 adjusted bit-loading values includes determining 507a whether tone deordering is necessary. When tone deordering is necessary, adjuster 262 adjusts 507b, as appropriate, the bit-loading table entries obtained from table 264 and provides the adjusted bit-loading table entries to TDO 250 for deordering 507b as appropriate. TDO 250 provides 507c the adjusted and deordered bit-loading values to demapper 246 and byte packer 244.

When tone deordering is unnecessary, adjuster 262 adjusts 507d, as appropriate, the bit-loading table entries obtained from table 264 and provides 507d the adjusted bit-loading table entries to TDO 250 for forwarding to demapper 246 and byte packer 244 without any deordering.

Figure 5C:
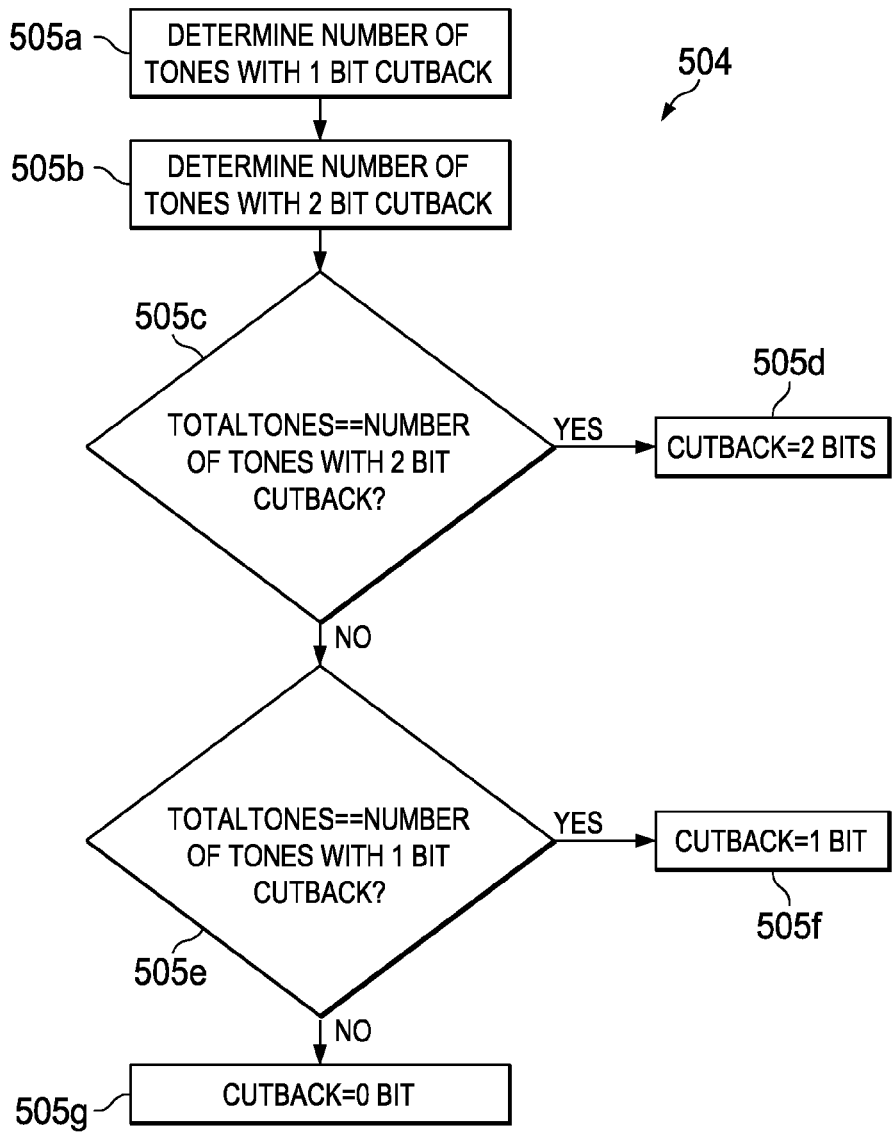
FIG. 5c illustrates the operation of determining whether adjusted bit-loading values are to be provided of FIG. 5a in greater detail according to an embodiment of the invention.

FIG. 5c illustrates the operation of determining whether adjusted bit-loading values are to be provided of FIG. 5a in greater detail according to an embodiment of the invention. In operation 504 the number of tones in a symbol in buffer 252 that is indicative of a 1 bit cutback is determined 505a, and the number of tones indicative of a 2 bit cutback is determined 505b. When the total number of tones, totaltones, for which the cutback evaluation is made is the same 505c as the number of tones indicative of a 2 bit cutback 505b, the cutback indication is set to indicate 505d '2 bit cutback.' When the total number of tones, totaltones, for which the cutback evaluation is made is not the same 505c as the number of tones indicative of a 2 bit cutback 505b, a determination 505e of whether a 1 bit cutback indication is appropriate is made. When the total number of tones, totaltones, for which the cutback evaluation is made 505e is the same 505c as the number of tones indicative of a 1 bit cutback 505a, the cutback indication is set to indicate 505f '1 bit cutback.' When the total number of tones, totaltones, for which the cutback evaluation is made is not the same 505e as the number of tones indicative of a 1 bit cutback, the cutback indication is set to indicate 505g '0 bit cutback.'

In the event of an erroneous determination of cutback by DL 250, too many bits or too few bits are provided to FEC decoder 243b resulting in a loss of synchronization. A loss of synch signal is produced by FEC decoder 243b and provided to CP 260. The loss of synch signal is produced when a certain threshold of 'bad' RS codewords is received by decoder 243b. The threshold may depend upon, among other factors, interleaver depth, data rate, line condition, etc . . . Setting such a threshold is well known in the art and can be determined by one of ordinary skill in the art without undue experimentation.

In an embodiment, receiver 240 regains RS codeword synchronization by adding bits in the receiver chain before decoder 243b. One of ordinary skill in the art would readily appreciate that the teachings of the invention can be extended to cover regaining codeword resynchronization for alternative embodiments that use forward error correction other than Reed-Solomon error correction and that such extensions are encompassed by the invention. Furthermore, one of ordinary skill in the art would appreciate that receiver 240 regains RS codeword synchronization by removing bits from the receiver chain before decoder 243b.

Consider the case where $N_{FEC}$ is 240 bytes (1920 bits) and that there are 1180 active tones. A subset of the tones, specifically 1920/2=960 tones, are subject to power reduction by 1 bit and only 1 bit cutback occurs. Since a RS codeword starts every 1920 bits and any sequence of power mode errors results in 960*n bits—where n is an integer—there is only 1 possible adjustment needed to achieve resynchronization of RS decoding: adding or, alternatively, removing 960 bits.

While in the foregoing illustrative case, $N_{FEC}$ is 240 bytes (1920 bits) and the number of tones is 1180, many other arrangements for RS codeword size and number of tones for which bit loading adjustments can be specified in any particular implementation of an embodiment, all of which are encompassed by the invention.

Consider the case where $N_{FEC}$ is 240 bytes and there are 1180 active tones. All 1180 tones to be subject to power reduction by 1 or 2 bits. Since 1180 and 1920 have 20 as the greatest common divisor (GCD) there are a maximum of 1920/20=96 alignment errors possible from any number of power mode decision errors. Resynchronization is achieved by sequentially testing 20 bit adjustments in the total bit loading up to 96 times. If none of those adjustments achieves synchronization, retraining is performed in an embodiment. When the maximum number of bits that can be added has been reached, CP 260 and the remainder of receiver 240 initiate a retrain process with the transmitter in order to achieve synchronization.

By changing $N_{FEC}$ to 236 bytes where number of tones is 1180, the GCD increases to 236 and only 8 alignments need to be tested. $N_{FEC}$ can usually be selected in a fairly wide range with little or no performance consequences. When the maximum number of bits that can be added (or removed, depending upon the embodiment) has been reached, CP 260 and the remainder of receiver 240 initiate a retrain process with the transmitter in order to achieve synchronization.

Figure 6A:
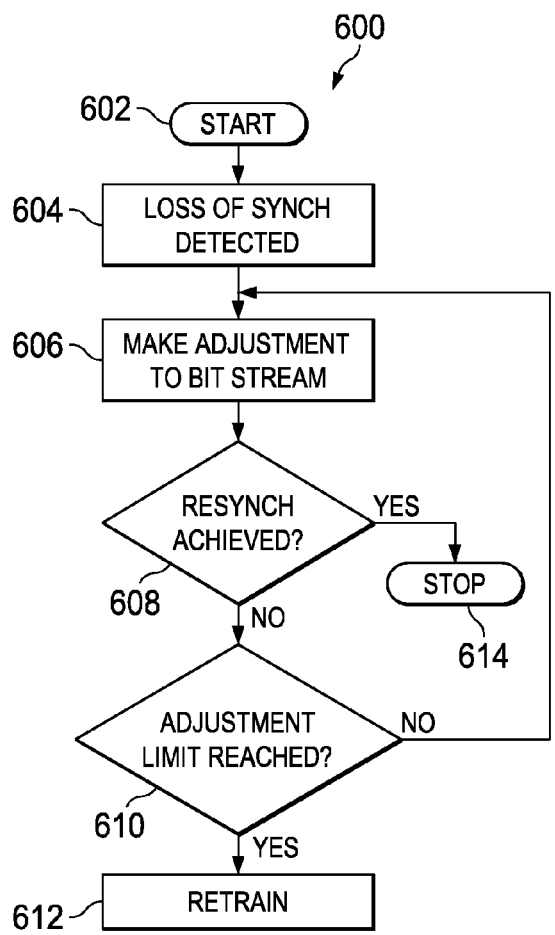
FIG. 6a illustrates a process for changing mode and regaining synchronization after it has been lost according to an embodiment.

FIG. 6a illustrates a process for changing mode and regaining synchronization after it has been lost according to an embodiment. FIG. 6b illustrates the initialization operation of FIG. 6a in greater detail according to an embodiment. In process 600, CP 260 starts 602 by determining a) the greatest common divisor (GCD) 603a for the number of tones for which cutback is possible (tones_of_cutback) and $N_{FEC}$ in terms of bits b) and the number alignments (number_of_alignments=(number of tones that can be cutback)/GCD) that need to be tested. In an embodiment, during initialization the following expression GCD($N_{FEC}$*8,tones_of_cutback) is maximized in order to minimize the number of possible alignments, which is given by $N_{FEC}$*8/GCD($N_{FEC}$*8,tones_of_cutback). Note that if GCD($N_{FEC}$*8,tones_of_cutback)= $N_{FEC}$*8, only 1 alignment is possible and no cutback error will cause an FEC SYNC error. CP 260 does not select values for $N_{FEC}$ that would result in no FEC SYNC error being produced when there is a cutback error.

In an embodiment, during the initialization phase of communication with a transmitter which may not be part of process 600 in an alternative embodiment, for a given number of tones for which cutback is possible CP 260 selects a value for $N_{FEC}$ such that the number of alignments (i.e., GCD) is as small as possible without resulting in serious performance degradation. The selected value for $N_{FEC}$ is communicated to the transmitter with which receiver 240 is communicating. In an alternative embodiment, the transmitter selects a value of $N_{FEC}$ that minimizes the number alignments that need to be tested in order to achieve resynchronization and provides that value to CP 260 of receiver 240.

While it is preferable to use a GCD number of bits to achieve resynchronization, it is possible in an alternative embodiment to use a smaller value which when multiplied by an integer yields the GCD that was calculated for the particular combination of the number of tones and $N_{FEC}$ being used for communication. In an embodiment, bit_adjustment_delta, the number of bits that are added (or removed) from the bit stream is set 603b by CP 260 to the value of GCD that was calculated for the particular combination of the number of tones and $N_{FEC}$ being used for communication. An alignment counter, alignment_counter, is initialized 602 to zero.

When loss of synchronization is detected 604 by CP 260, CP 260 makes 606 an adjustment to the bit stream reaching decoder 243b and increments alignment_counter. CP 260 then determines 608 whether resynchronization has been achieved. In an embodiment, this determination is made by after CP 260 receives a synchronization signal from decoder 243b. When resynchronization has been achieved, CP 260 stops 614 process 600 and continues with other functions. When resynchronization has not been achieved, CP 260 then determines 610 whether an adjustment limit has been reached by, in an embodiment, determining whether alignment_counter is the same as number_of_alignments, which is the limit on the number of adjustments that can be made.

When the adjustment limit has been reached, CP 260 initiates 612 a retrain process with the corresponding transmitter in order to regain synchronization. When the adjustment limit has not been reached, CP 260 makes 606 another adjustment to the bit stream.

Figure 6C:
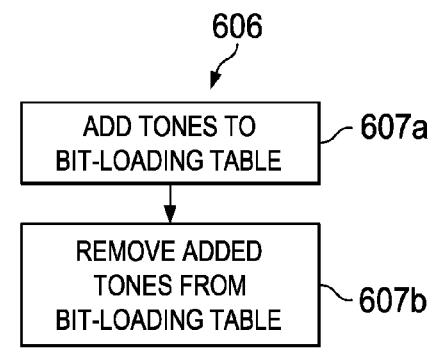
FIG. 6c illustrates the operation of adjusting the bit stream in order to regain synchronization of FIG. 6a in greater detail according to an embodiment of the invention.

FIG. 6c illustrates the operation of adjusting the bit stream in order to regain synchronization of FIG. 6a in greater detail according to an embodiment of the invention. In an embodiment, CP 260 adds 607a 'fake tones,' at the beginning or the end of table 264, that total the number of desired bits and asserting a constellation value of Q=I=1 for the added tones. Some Viterbi decoders (e.g., Wei's 4D decoder) known in the art run in data order and allow an even number of Q=I=1 constellations to be inserted at the beginning or end of the DMT symbol without inducing errors in the remainder of the signal. Decoders are described in paragraph 8.6.2 of standard ITU G.992.3.

In an embodiment, CP 260 adds 'fake tones' for the duration of one DMT symbol at a time. In other words, CP 260 removes 607b the added fake tones at the conclusion of the processing of the bits of the DMT symbol for which 'fake tones' were added. CP 260 checks 608 for a synchronization indication from decoder 243b. If no synchronization indication is received within a certain period of time that is implementation dependent, CP 260 adds 'fake tones' for another DMT symbol. The foregoing process is repeated until resynchronization is achieved or the limit on bits that can be added has been reached.

Figure 6D:
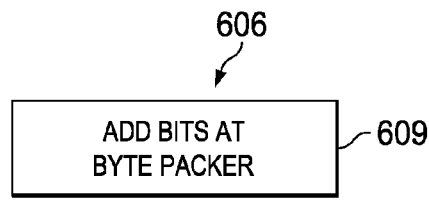
FIG. 6d illustrates the operation of adjusting the bit stream in order to regain synchronization of FIG. 6a in greater detail according to an embodiment of the invention.
Figure 6E:
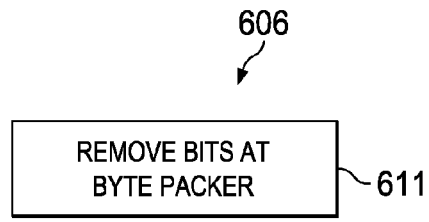
FIG. 6e illustrates the operation of adjusting the bit stream in order to regain synchronization of FIG. 6a in greater detail according to an embodiment of the invention.
Figure 6B:
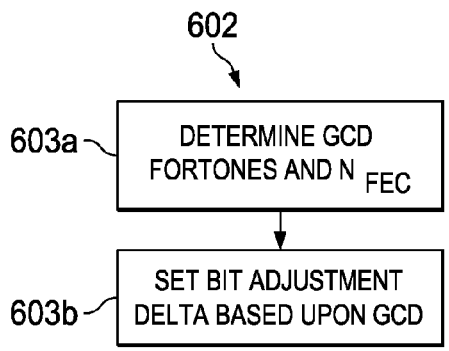
FIG. 6b illustrates the initialization operation of FIG. 6a in greater detail according to an embodiment.

FIG. 6d illustrates the operation of adjusting the bit stream in order to regain synchronization of FIG. 6a in greater detail according to an embodiment of the invention. FIG. 6e illustrates the operation of adjusting the bit stream in order to regain synchronization of FIG. 6a in greater detail according to an embodiment of the invention. In an alternative embodiment, bit_adjustment_delta bits can also be added 609 or, alternatively, removed 611 by byte packer 244. In such alternative embodiments, byte packer 244 accepts from CP 260 an indication of the number of bits to be added or removed. BP 244 may then insert bits that were erroneously not supplied by demapper 246 or remove bits that were erroneously supplied by demapper 246.

Figure 6F:
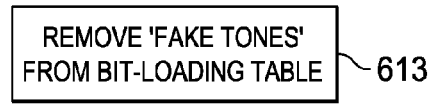
FIG. 6f illustrates the operation of adjusting the bit stream in order to regain synchronization of FIG. 6a in greater detail according to an embodiment of the invention.

FIG. 6f illustrates the operation of adjusting the bit stream in order to regain synchronization of FIG. 6a in greater detail according to an embodiment of the invention. In an alternative embodiment, the bit-loading table operates normally with additional fake tones that result in bit_adjustment_delta bits being added for each DMT symbol. The additional bits are ignored by the remainder of the receive chain. However, when a loss of synchronization occurs the fake tones are selectively removed 613 for subsequently received symbols until resynchronization reoccurs or a retraining is necessary.

Referring again to FIG. 4b, data stream 120 also represents the output of data scrambler 243c. When an improper mode change occurs a loss of synchronization also happens at CRC checksum unit 243d causing unit 243d to be unable to distinguish OH bytes from CRC or payload bytes and for the OH bytes to be extracted and decoded to create the received OH channel.

Techniques for regaining synchronization in the OH channel include: 1) restricting overhead byte insertion to a simple periodic pattern and using a hunting algorithm for proper CRC to detect the CRC byte; 2) having a receiver indicate to the transmitter that synchronization has been lost so that the transmitter will transmit a FLAG byte continuously instead of an OH byte and having the transmitter transmit only a FLAG byte until instructed otherwise by the receiver.

With regards to the first technique, in an embodiment, control processor 260 uses the linearity property of the CRC of two sequences to quickly identify a CRC byte in the sequence of bytes produced by descrambler 243c.

Let $B1=(B11x^{(N-1)}+B21x^{(N-2)}...)$ where N is a DSL mux data frame. DSL mux data frames can be identified by CRC unit 243d because they start at the beginning of RS codewords. Let $C1=(B1x^{(N(M-1))}+B2x^{(N(M-2))}+...)$ be a complete overhead frame where M=seqp*Tp. If CRC(Bn) is known, it is possible to compute CRC(C) as CRC(C1)+CRC(C2)=CRC(B1x^{N(M-1)})+CRC(B2x^{N(M-2)})+ . . . where $C2=B2x^{N(M-1)}+B3^{N(M-2)}+...$. But $CRC(B1x^{N(M-1)})=CRC(B1x^{N(M-2)})x^{8N}$ mod g(x). Now $Qx^{8N}$ mod g(x) can be found quickly with a pre-computed lookup table (LUT) stored in memory 266. Thus, by recursion CRC(C1)= . . . LUT(LUT(LUT(CRC(B1))+CRC(B2))+ . . . ) where LUT indicates that a LUT operation is to be performed with the value in between the parentheses ( ) as the argument or index into the LUT. This algorithm is iterated over relatively large blocks of data so that the LUT recursion is a fast computation. This allows computation of CRC(Cy) for many alignments very quickly. In addition, only the values of CRC(By) need to be stored to test many alignments.

Figure 7A:
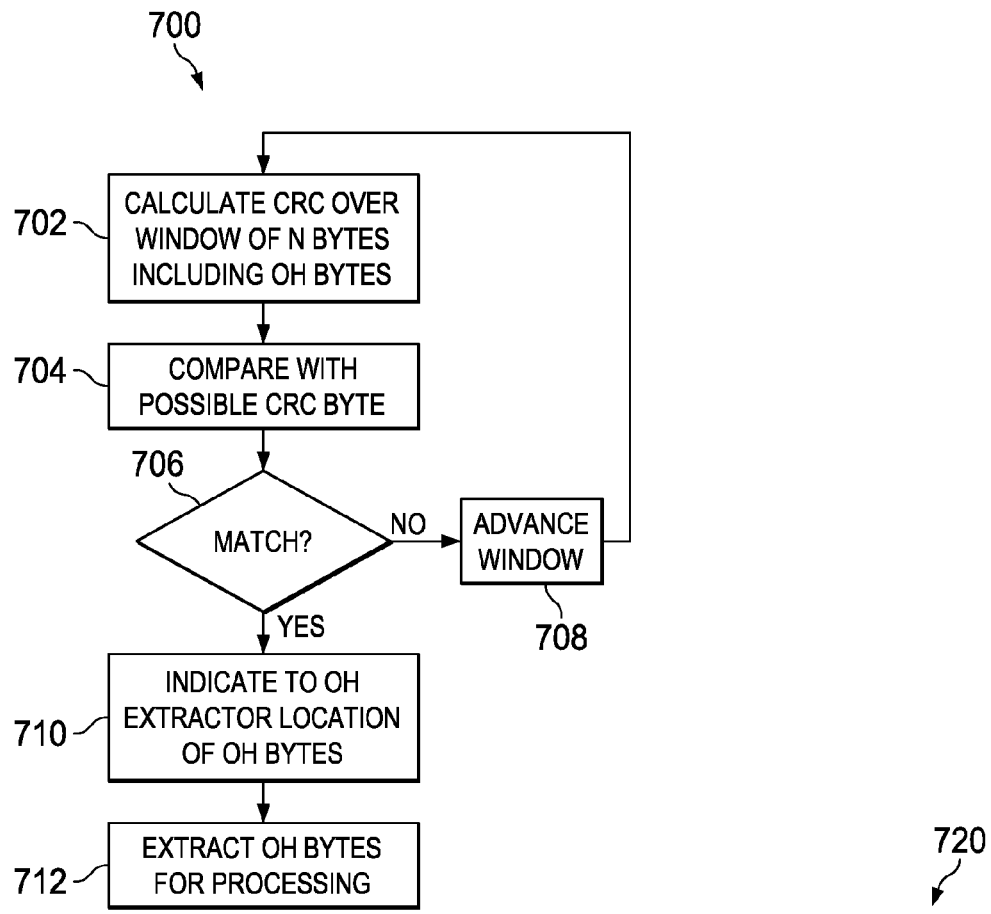
FIG. 7a illustrates a process of regaining synchronization for an overhead channel which is in a data stream in which OH bytes and CRC bytes are present in a periodic pattern.

FIG. 7a illustrates a process of regaining synchronization for an overhead channel which is in a data stream in which OH bytes and CRC bytes are present in a periodic pattern. In process 700, control processor 260 does a sliding window CRC computation and computes 702 the CRC of (B1 B2. . . BN) by the LUT table method described elsewhere herein. Using the described efficient recalculation technique for the CRC of a sliding window of N bytes, control processor 260 compares 704 the CRC of a certain N sequential bytes to the $(N+1)^{st}$ byte. Control processor 260 determines whether the CRC of a certain N sequential bytes is equivalent 706 to the $(N+1)^{st}$ byte. When the computed CRC for the certain N sequential bytes is not equivalent to the $(N+1)^{st}$ byte, control processor 260 advances 708 the N-byte-long window by 1 byte. When the computed CRC for the certain N sequential bytes is equivalent to the $(N+1)^{st}$ byte, control processor 260 indicates 710 to CRC checksum unit 243d where the OH bytes can be found in data stream 120 of FIG. 4b. CRC checksum unit 243d is then able to do a CRC check on the bytes it receives from descrambler 243c and produce 712 OH bytes for the overhead channel.

Figure 7B:
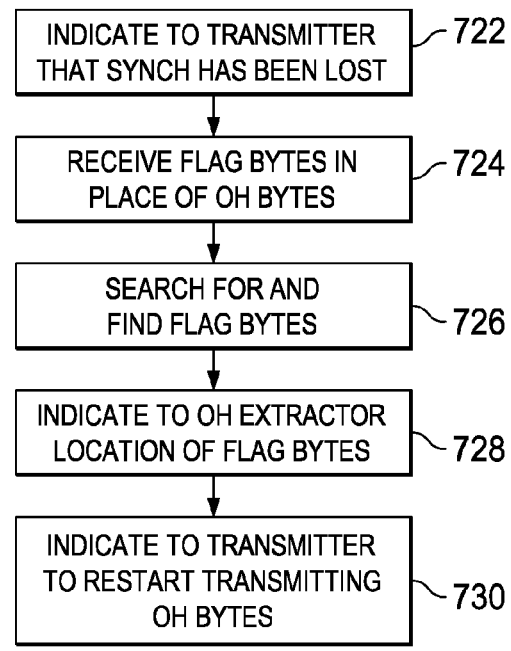
FIG. 7b illustrates a process of regaining synchronization for an overhead channel for which OH bytes are replaced with FLAG bytes according to an embodiment.

FIG. 7b illustrates a process of regaining synchronization for an overhead channel for which OH bytes are replaced with FLAG bytes according to an embodiment. With regards to the second technique for regaining synchronization for the OH and CRC bytes at the output of descrambler 243c, control processor 260 communicates to a transmitter such as transmitter 200 through an administration channel that synchronization has been lost 722. Control logic 216 of transmitter 200, in response to receiving a loss of synchronization signal, transmits, instead of OH bytes, FLAG bytes that are received 724 by control processor 260. Control processor 260 then searches 726 for the FLAG byte that should appear periodically at overhead byte locations 122. Once control processor 260 finds the FLAG bytes in the overhead channel it indicates 728 to CRC checksum unit and OH byte extractor 243d the location of the FLAG bytes so that OH byte extractor 243d is synchronized with the pattern of OH and CRC bytes that will resume. Control processor 260 also instructs transmitter 200 that synchronization in the OH channel has been achieved and that transmitter 200 can resume transmitting 730 OH bytes and CRC bytes. In an alternative embodiment, transmitter 200 transmits FLAG bytes for a predetermined fixed time period and then resumes transmitting OH bytes and CRC bytes. In such an alternative embodiment, transmitter 200 does not depend upon control processor 260 to indicate that synchronization in the OH channel has been achieved.

In an alternative embodiment, transmitter 200 transmits FLAG bytes for a predetermined fixed time period and then resumes transmitting OH bytes and CRC bytes. In such an alternative embodiment, transmitter 200 does not depend upon control processor 260 to indicate that synchronization in the OH channel has been achieved. If, after a fixed time period, control processor 260 is unable to detect FLAG bytes after indicating that synchronization has been lost to transmitter 200, control processor 260 indicates again to transmitter 200 that synchronization in the OH channel has been lost.

In the preceding specification, the invention has been described with reference to specific exemplary embodiments of the invention. It will, however, be evident to one of ordinary skill in the art that various modifications and changes be made without departing from the broader spirit and scope of the invention as set forth in the claims that follow. The specification and drawings are accordingly to be regarded in an illustrative rather than restrictive sense and the intention is not to be limited to the details given herein, but rather to be modified within the scope of the appended claims along with their full scope of equivalents. The various elements or components described herein may be combined or integrated in another system or certain features may be omitted, or not implemented.

What is claimed is:

1. A method of synchronizing a receiver with a transmitter, the method comprising:
   determining number of bits, j, for adjusting a bit stream, wherein the bit stream is generated from n tones and is dividable into codewords having a codeword length of N bytes, and the number of bits for adjusting the bit stream is determined based upon n and N;

detecting a loss of synchronization indication;

in response to detection of the loss of synchronization indication, adjusting the bit stream by j bits;

determining whether synchronization has been regained;

when synchronization has not been regained, adjusting the bit stream again by j bits;

when synchronization has been regained terminating adjustment of the bit stream.

2. The method of claim 1, wherein adjusting the bit stream includes adding j bits to the bit stream.

3. The method of claim 2, wherein j bits are added to the bit stream by adding 'fake' tones to a bit-loading table.

4. The method of claim 2, wherein j bits are added to the bit stream by a byte packer.

5. The method of claim 1, wherein adjusting the bit stream includes removing j bits from the bit stream.

6. The method of claim 5, wherein j bits are removed from the bit stream by removing 'fake' tones from a bit-loading table.

7. The method of claim 5, wherein j bits are removed from the bit stream by a byte packer.

8. The method of claim 1, further comprising determining whether a limit on number of adjustments is reached.

9. The method of claim 8, further comprising, when the limit on number of adjustments has been reached, initiating a retraining process in order to regain synchronization.

10. The method claim 1, wherein adjustments to the bit stream are made until one of a) a limit on number of adjustments is reached, b) synchronization is regained, and c) retraining in order to regain synchronization is initiated.

11. The method of claim 1, further comprising selecting a value for N in order to maximize the greatest common divisor of N and n.

12. The method of claim 1, further comprising calculating cyclic-redundancy checks for a sliding window of N bytes composed from the adjusted bit stream in order to identify a valid CRC, wherein the sliding window of N bytes includes at least one overhead byte and at least one CRC byte and there is a periodic pattern to the at least one overhead byte and the at least one CRC byte.

13. The method of claim 12, further comprising, based upon the location of the valid CRC, identifying the at least one overhead byte.

14. The method of claim 1, further comprising:

sending to a transmitter a loss of synchronization indication;

receiving, in response to sending the loss of synchronization indication, at least two FLAG bytes; and based upon the locations of the at least two FLAG bytes, identifying overhead bytes and CRC bytes received from the transmitter.

15. An apparatus that achieves synchronization with a transmitter, the apparatus comprising:

control processor that is to determine number of bits, j, for adjusting a bit stream, wherein the bit stream is generated from n tones and is dividable into codewords having a codeword length of N bytes, and the number of bits for adjusting the bit stream is determined based upon n and N;

a decoder that is to produce a loss of synchronization indication for the control processor when the bit stream produces invalid codewords;

wherein the control processor in response to detection of the loss of synchronization indication is to adjust the bit stream by j bits;

wherein the control processor is to determine whether synchronization has been regained;

wherein, when synchronization has not been regained, the control processor is to adjust the bit stream again by j bits;

wherein, when synchronization has been regained, the control processor is to terminate adjustment of the bit stream.

16. The apparatus of claim 15, further comprising a bit-loading table and wherein the adjustment by j bits is made by the control processor adding 'fake' tones to the bit-loading table.

17. The apparatus of claim 15, further comprising a byte packer and wherein the adjustment by j bits is made by the control processor instructing the byte packer to add j bits to the bit stream.

18. The apparatus of claim 15, further comprising a byte packer and wherein the adjustment by j bits is made by the control processor instructing the byte packer to remove j bits from the bit stream.

19. The apparatus of claim 15, further comprising a bit-loading table and wherein the adjustment by j bits is made by the control processor removing 'fake' tones to the bit-loading table.

20. The apparatus of claim 15, wherein the control processor is to determine whether a limit on number of adjustments is reached.

21. The method of claim 20, wherein, when the limit on number of adjustments has been reached, the control processor is to initiate a retraining process in order to regain synchronization.

22. The apparatus of claim 15, wherein the control processor is to select a value for N in order to maximize the greatest common divisor of N and n.

23. The apparatus of claim 15, wherein the control processor is to calculate cyclic-redundancy checks for a sliding window of M bytes composed from the adjusted bit stream in order to identify a valid CRC, wherein the sliding window of M bytes includes at least one overhead byte and at least one CRC byte and there is a periodic pattern to the at least one overhead byte and the at least one CRC byte.

24. The apparatus of claim 15, wherein based upon the location of the valid CRC, the control processor is to identify the at least one overhead byte.

25. The apparatus of claim 15, wherein the control processor is to send to the transmitter an overhead channel loss of synchronization indication, is to receive, in response to sending the loss of synchronization indication, at least two FLAG bytes, based upon the locations of the at least two FLAG bytes, is to identify the location of overhead bytes and CRC bytes received from the transmitter, further comprising an overhead channel byte extractor that is to extract overhead bytes based upon the location of overhead bytes obtained from the control processor.

* * * * *